United States Patent [19]
Chase

[11] Patent Number: 5,385,099
[45] Date of Patent: Jan. 31, 1995

[54] STRESS RELIEF SYSTEM FOR SLOTTED PROPELLANT MOTORS

[75] Inventor: Charles A. Chase, Monte Sereno, Calif.

[73] Assignee: United Technologies Corporation, Hartford, Conn.

[21] Appl. No.: 31,516

[22] Filed: Mar. 15, 1993

[51] Int. Cl.⁶ .............................................. C06B 45/00
[52] U.S. Cl. ...................................... 102/289; 102/288
[58] Field of Search .................................. 102/288, 289

[56] References Cited

U.S. PATENT DOCUMENTS

| | | | |
|---|---|---|---|
| 2,978,308 | 4/1961 | Keller | 52/0.5 |
| 3,066,481 | 12/1962 | George et al. | 60/35.6 |
| 3,090,196 | 5/1963 | Brewer | 60/35.6 |
| 3,256,819 | 6/1966 | Leeper | 102/98 |
| 3,691,955 | 9/1972 | Jordan et al. | 102/99 |
| 3,713,395 | 1/1973 | Carpenter et al. | 102/103.6 |
| 3,807,171 | 4/1974 | Anderson | 60/255 |
| 3,994,233 | 11/1976 | Travor et al. | 102/85.2 |
| 4,052,943 | 10/1977 | Elrick | 102/103 |
| 4,442,666 | 4/1984 | Vetter | 60/39.47 |
| 4,458,482 | 7/1984 | Vetter et al. | 60/253 |
| 4,466,352 | 8/1984 | Dalet et al. | 102/288 |
| 4,494,373 | 1/1985 | Vetter et al. | 60/253 |
| 4,590,860 | 5/1986 | Kromrey | 102/289 |
| 4,696,233 | 9/1987 | Paxton | 102/288 X |
| 4,756,248 | 7/1988 | Sato | 102/287 |
| 4,764,319 | 8/1988 | Hightower, Jr. et al. | 102/289 X |
| 4,792,423 | 12/1988 | Craig et al. | 102/289 X |
| 4,817,828 | 4/1989 | Goetz | 102/288 |
| 4,936,092 | 6/1990 | Andrew | 60/245 |
| 5,000,885 | 3/1991 | Laird et al. | 102/289 X |

*Primary Examiner*—Peter A. Nelson
*Attorney, Agent, or Firm*—Alan C. Cohen

[57] ABSTRACT

The present invention is for a means to relieve stress in slotted solid propellant rocket motors. The invention provides for one or more articulated members located between the outer edge of a secondary slot and the layer of thermal insulation. Also disclosed is a method of forming the articulated members.

12 Claims, 2 Drawing Sheets

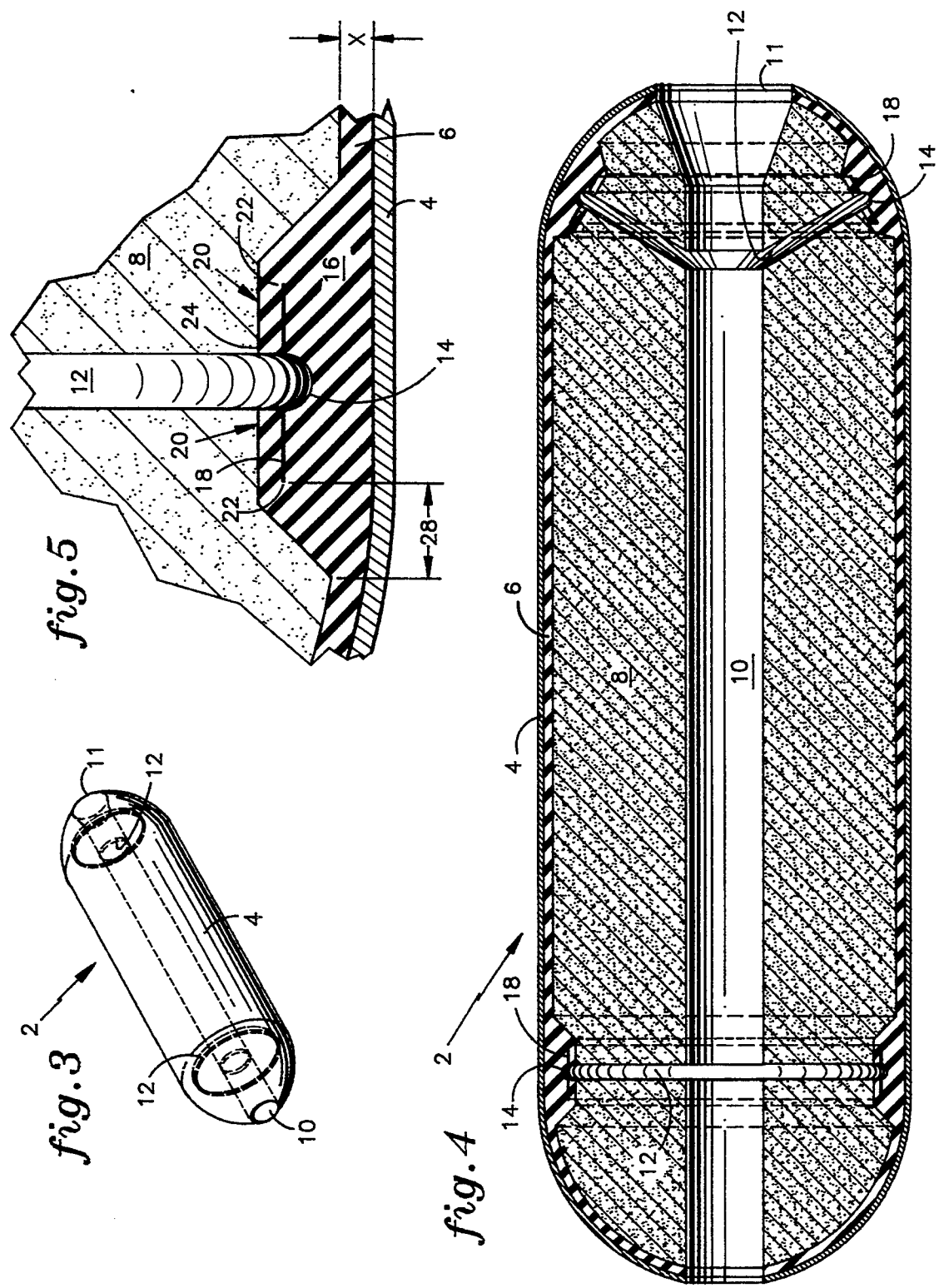

STRESS RELIEF SYSTEM FOR SLOTTED PROPELLANT MOTORS

TECHNICAL FIELD OF THE INVENTION

The present invention relates to solid propellant rocket motors and in particular means for improving propellant loadings and release of stress developed in the propellant grain.

BACKGROUND OF THE INVENTION

Rocket motors 2 using solid propellant are typically comprised of a rocket case 4, usually formed of metal or composite material, a thermal insulation layer 6 lining the interior wall of the rocket casing and the solid propellant 8 (see FIGS. 1 and 2). Running along the longitudinal axis and through the center of the propellant is a central pathway 10. During ignition, the propellant burns and the combustion products pass through the central pathway 10 to the nozzle 11 thereby propelling the rocket.

The rate at which the solid propellant 8 burns establishes the flight characteristics or thrust pattern of that rocket. Unlike liquid fuel rockets, there is no means to control or alter the amount of fuel entering the combustion area during ignition. However, rocket designers have developed a method of forecasting the performance or thrust history of these solid rockets by altering the surface area of the propellant grain exposed to ignition. To achieve this, the propellant grain 8 is designed with specific pathways or slots 11 configured to yield the desired thrust history. In most propellant grain designs the configuration includes a central slot 10 along the longitudinal axis or length of the propellant grain as well as secondary slots 12 formed about the central slot 10. These secondary slots 12 typically extend radially from and coaxially about the central slot 10. However, these slots create areas of stress, particularly at the outer edges 14 of the secondary slots 12. These stresses may produce tears or cracks within the propellant and alter the burn pattern with catastrophic results. It has been found that the amount of stress built up at the outer edge 14 of these secondary slots 12 is a function of the diameter of the secondary slot 12.

One solution to this problem has been to coat the surface of the slot with an organic layer to strengthen the binder in the propellant grain and thereby reduce the impact of the stresses on the propellant. See U.S. Pat. No. 4,052,943.

An alternative approach has been to increase the diameter of the secondary slot 12, thereby increasing the radius of the outer edge 14 and relieving the stress. This approach, although helpful, results in lower propellant loadings, and therefore, less than optimum performance.

Therefore, what is needed in this art is a simple, effective means to relieve the stress at the outer edge of these secondary slots while permitting higher loading efficiencies for the motors.

DISCLOSURE OF THE INVENTION

The stress relief system of the present invention comprises the use of one or more articulated members positioned between the layer of thermal insulation and the outer edge of the secondary slot in a solid propellant rocket motor.

The articulated members being capable of sufficient movement or flexibility to relieve the stresses generated about the outer edges of the radially extending slots during storage or ignition of the rocket motor and mitigate the possibility of catastrophic failure.

Another aspect of the stress relief system is a method for forming the articulated members, where the outer edge of the secondary slot passes through the surface of a thickened area of the thermal insulation and through a layer of release material. embedded in said thickened thermal insulation area forming two articulated members, each having its distal end attached to the insulating layer and its proximal end free to move and relieve the stresses developed at the outer edge of the secondary slot.

BRIEF DESCRIPTION OF THE DRAWINGS

FIG. 3 is a perspective view of a rocket motor depicting the relief system of the present invention.

FIG. 4 is a cross sectional view of a rocket motor with the relief system of the present invention.

FIG. 5 is a cross sectional view of a single stress relief point of the present invention.

BEST MODE FOR CARRYING OUT THE INVENTION

Figures 1, 2:
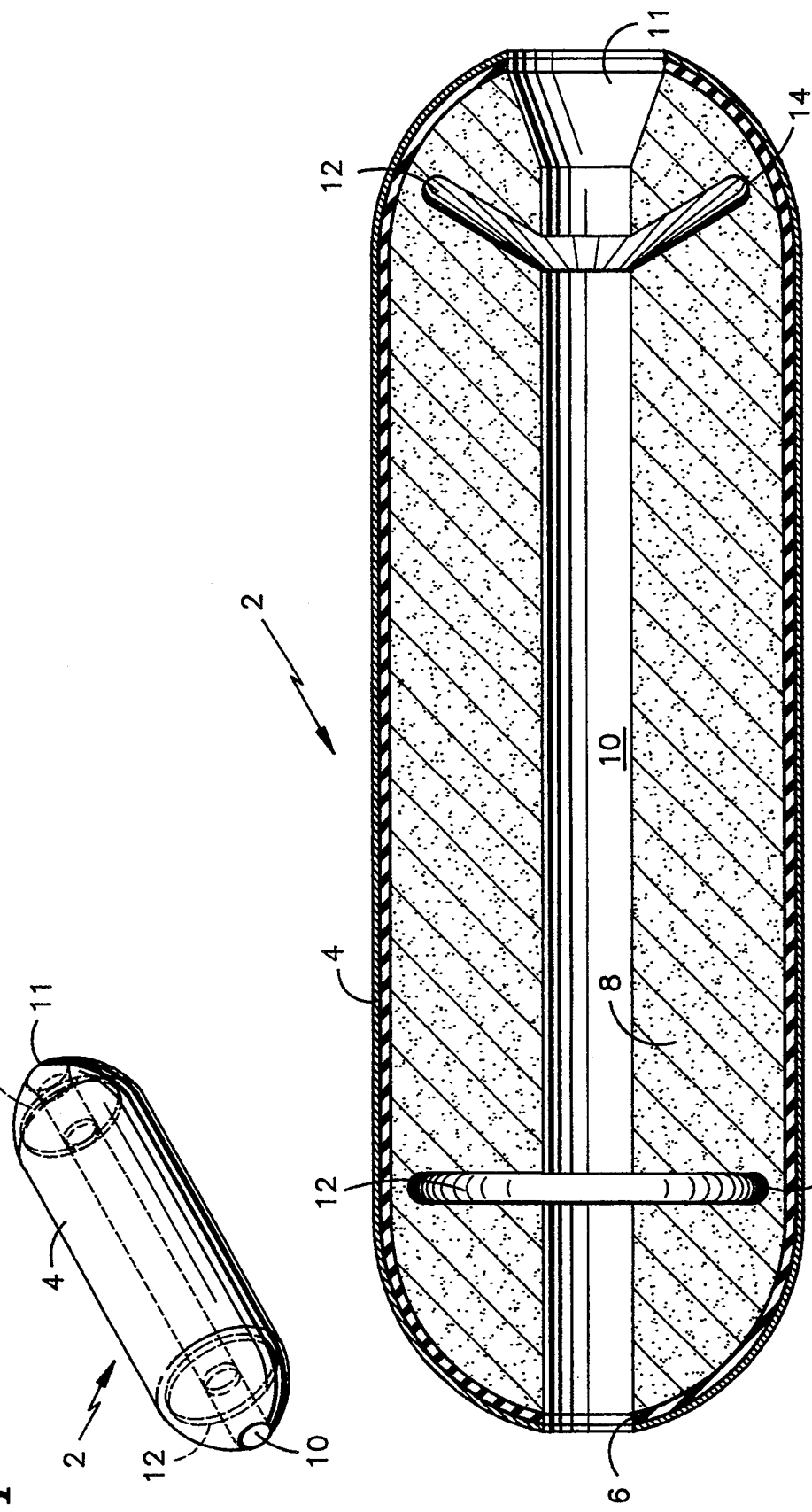
FIG. 1 is a cross-sectional view of the prior art stress relief system.
FIG. 2 is a perspective view of a rocket motor of the prior art having the prior art stress relief slots.

Referring now to the drawings which are meant to be exemplary and not limiting. FIGS. 3, 4 and 5 depict a rocket motor 2 having an outer casing 4 which is lined with a layer of insulation material 6 and bonded to said insulation layer is the rocket propellant 8. Positioned along the longitudinal axis of the rocket is a central slot 10 for the passage of exhaust gases which are developed during ignition and burning of the propellant to the exhaust nozzle 11. Radiating about the central slot 10 are one or more radially extending, secondary slots 12 which in this depiction are formed coaxially about the central pathway 10. As stated above, these secondary slots 12 operate to control the propellant burnback characteristics and thus control the shape of the thrust history of the rocket motor. In addition, positioned adjacent to the outer edge 14 of the secondary slots 12 and the insulating layer 6 are one or more articulating members 20. Typically, these articulating members 20 are attached at one end 22 (the distal end) to the insulating layer 6 such that the other end 24 of the articulating member 20 closest to the outer edge 14 of the secondary slot 12 (the proximal end) is free to move and thereby relieve the stresses developed at the outer edge 14 of the secondary slot 12.

One method of forming these articulated members is to form at the outer edge 14 of each secondary slot 12 a thickened area of insulation 16 having embedded inside it a layer of release material which is positioned substantially perpendicular to the outer edge 14 of the secondary slot 12. In the inactive state the release layer 18 is encapsulated within the thickened area of insulation 16. However, as the secondary slot 12 is formed, the outer edge 14 is extended through the surface of the thickened area of insulation 16 above the release layer 18 and the release layer itself 18, resulting in the formation of two articulated members 20 attached at their distal ends 22. These flexible or movable articulated members permit movement of the propellant grain thereby eliminating the stresses formed at the outer edge 14 of the secondary slot 12.

Although the above description describes the features of a thickened area of thermal insulation and a layer of release material to permit formation of those articulated members by extending the outer edge of the secondary slots through such layers, this invention should not be so limited. This invention, as set forth in the claims, contemplates the use of other articulating members to act as stress relievers which would be obvious to one ordinary skill in view of this teaching.

The method of manufacturing the stress relief systems is best performed as follows:

During production of the rocket the inner surface of the rocket case is coated with a thermal insulating material 16. This material is typically some form of vulcanizable rubber and is formed by applying a series of layers of the uncured or "green" insulating material onto the surface of the rocket case. The insulating layer is generally uniform in thickness, that thickness varying depending on the type of insulating material chosen.

During the insulation formation process, the insulation at those points predetermined to be thickened are built up by adding more insulating material until a predetermined height is achieved.

The height or thickness of the thickened area of insulation 16 necessary to permit the stress relief system to function properly will vary depending on the propellant, the design of the rocket. etc. However, the thickened area will generally be in the range of about 0.2 in. to about 0.4 in. above the base elevation of the insulating layer (seen as x in the drawings). While the thickness of the layer of insulation above the layer of release material may be about 0.1 in to about 0.2 in. the actual thickness necessary will vary and will be a function of the physical properties of the specific insulating materials used.

In fact, the reason for forming a thickened area of insulation is to insure that sufficient insulation remains between the outer edge 14 of the secondary slot 12 and the rocket casing 4 to prevent a problem during ignition. Thicker layers could be applied uniformly throughout the rocket case thereby achieving the same end result without forming selective thickened areas. However, such an approach would result in lower propellant loadings due to less space available within the rocket casing.

Once the thickened areas of insulation 16 are formed a layer of release material is applied to the top of the thickened area of insulation and additional insulating material is applied to cover the release material 18 to a depth sufficient to permit the eventual articulated members 20 to remain hinged when formed and to achieve the final design thickness of the thickened area 16.

The release material 18 used in this process may be any material which will not bond to the insulation itself. Teflon ® or other fluorinated polymers are preferred, however, any number of other materials capable of performing this function would be readily known to those skilled in the art or easily determined by simple testing. Typically the release material 18 will be in the form of a sheet but other forms such as powder could be used. important that the release material 18 not bond to the propellant 8 itself as such a material would not permit the articulated members 20 to move freely thereby relieving the stress.

The layer of release material 18 should be positioned approximately equidistant from each side 28 of the thickened area 16. This permits the release material 18 to remain connected or embedded in the insulation 6 at the extremities or distal ends 22 from the outer edge 14 of the secondary slot 12, while the proximal or closest end 24 to the outer edge 14 of the secondary slot 12 is free to move. In addition the layer of release material should be designed such that its length is shorter than the width of the thickened area yet wider than the diameter of the outer edge 14 of the secondary slot 12. This will permit the proper formation of the articulated members 20 once the slot is formed. It should be noted that if the release layer 18 is not wider than the diameter of the outer edge 14 of the secondary slot 12 then the articulated members 20 would not be free to move and hence would not work.

Once the uncured insulation 6 and the release material 18 is in place, the insulation is caused to cure/vulcanize through the application of heat and pressure. After the insulation is vulcanized, the propellant is introduced into the casing and bonded to the insulating layer. This is performed in any one of a number of conventional procedures. For example by pouring the uncured propellant into the casing and causing it to cure in situ.

After the propellant grain has been cured, the secondary slots 12 are formed using conventional techniques, such as machining with a lathe. These secondary slots 12 are preferably formed as radially extending continuous slots, formed coaxially about the central slot 10 (as depicted in the Figures). However, other secondary slot configurations are contemplated such as discontinuous coaxial slots or other designs. These secondary slots must be in flow path communication with the central slot to permit the gases generated during ignition to travel to the exhaust nozzle.

These secondary slots are formed to a depth such that the outer edge 14 of the secondary slot 12 penetrates through the area of insulation above the release material 18 and through the release material 18, thus activating the articulated members 20. Once the articulated members 20 are formed they are free to move with the propellant grain 8 to relieve the stresses generated during ignition or storage.

This invention improves two key aspects of solid propellant rocket motors. First, the use of the stress relief system significantly reduces the tendency for cracks to form or debonding of the propellant from the insulation occurring due to the stresses built up in the propellant due to long term storage or during ignition. This will in turn vent possible catastrophic failures due to uncontrolled burning during ignition. The second benefit is that with the stress relief mechanism in place the design of the secondary slot to avoid the formation of stresses required in the past is no longer necessary. This permits the design of narrower slots and thus permits higher loadings for the rocket resulting in higher performance.

What is claimed is:

1. A stress relief system for relieving stress in a thermally insulated, solid propellant rocket motor having one or more secondary slots having outer edges comprising:

one or more articulated members said articulated members having a distal end and a proximal end wherein said distal end is affixed to the layer of the thermal insulation and the proximal end is free to relieve the stresses developed at the outer edge of the secondary slot.

2. The stress relief system of claim 1 wherein the articulated members have been formed by extending the outer edge of a secondary slot through the surface of the thermal insulation and a layer of release material.

3. The stress relief system of claim 2 wherein the release material is a film.

4. The stress relief system of claim 3 wherein the film is polytetrafluoroethylene.

5. A method of relieving stress formed in a the outer edge of a secondary slot of a solid propellant rocket motor comprising:
   a. preparing a rocket casing having an internal surface;
   b. lining the internal surface with a thermal insulating layer;
   c. applying a layer of release material to the thermal insulation layer at predetermined locations;
   d. applying thermal insulation to cover the layer of release material;
   e. placing the solid propellant into the rocket casing;
   f. curing the propellant;
   g. forming one or more secondary slots in the propellant such that the outer edge of the slot penetrates through the layer of insulating material thereby forming one or more articulated members.

6. The method of claim 5 wherein the outer edge of the secondary slot penetrates through the layer of release material.

7. The rocket motor of claim 6 wherein said layer of release material is shorter than the width of the thickened insulation.

8. The rocket motor of claim 5 wherein the release material is a film.

9. The rocket motor of claim 8 wherein the film is polytetrafluoroethylene.

10. The rocket motor of claim 5 wherein the thermal insulation layer has thickened areas positioned near the outer edge of the secondary slots and said thickened areas contain a layer of release material and wherein the outer edge of the secondary slot passes through a surface of the insulating layer and the release material to form the articulated members.

11. The rocket motor of claim 10 wherein the thickness of thickened area is about 0.1 inch to about 0.2 inch.

12. The stress relief system of claim 10 wherein the thickness of thickened area is about 0.2 inch to about 0.4 inch.

* * * * *